Patented June 2, 1925.

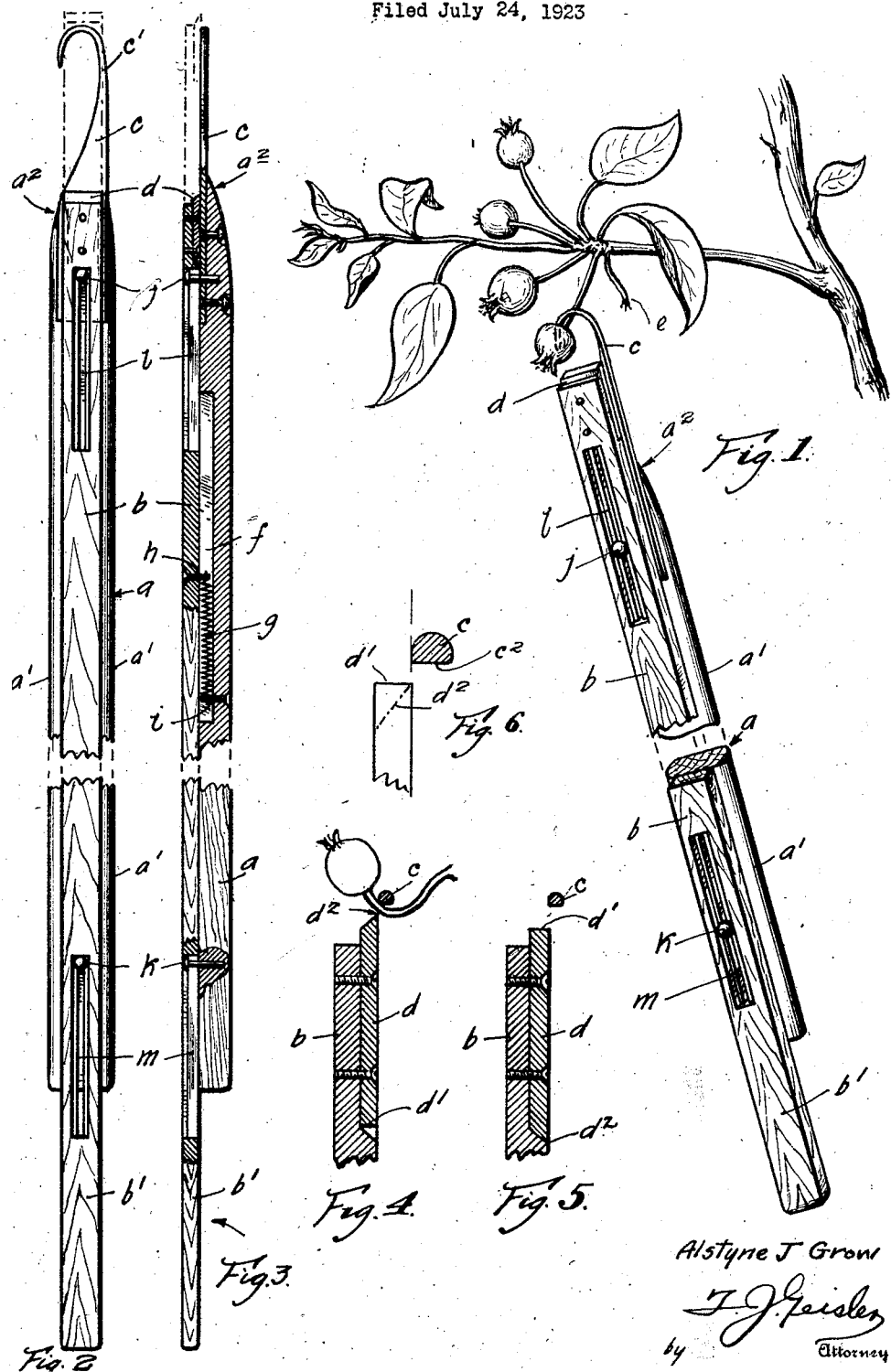

1,540,392

UNITED STATES PATENT OFFICE.

ALSTYNE J. GROW, OF HOOD RIVER, OREGON.

FRUIT THINNER.

Application filed July 24, 1923. Serial No. 653,495.

*To all whom it may concern:*

Be it known that I, ALSTYNE J. GROW, a citizen of the United States, and resident of Hood River, county of Hood River, and State of Oregon, have invented a certain new and useful Improvement in Fruit Thinners, of which the following is a specification.

As well known, in commercial orchards the fruit is thinned in order to cut down the quantity, and obtain a better and larger fruit. For example, in apple trees the fruit is left no closer on the tree than 4, 6 or 8 inches apart, so that the fruit will be induced to grow larger, more uniform in size, and the tree will not tend to overbear in the heavy years.

The thinning is usually done by hand, or with some scissors-like device. Such means suffice where the fruit can be readily reached by the operator while standing on the ground; but, obviously, this is within a very limited range only. Furthermore, thinning shears are sharp pointed and often puncture the good fruit, and the complaint is often made that those who use the thinning shears, will inadvertently snip off the cluster of leaves that the young fruit depends upon for nutriment, thus injuring its development.

The object of my invention is to provide a simple inexpensive implement handy to use for thinning the fruit, and by which the operator can as readily operate on the fruit out of the reach of his hands as that nearby; and furthermore, so that this work may be conveniently and expeditiously done, with but little use of a ladder.

It is further my object so to construct the implement that it may be operated to cut or break off the fruit to be removed from the stem, according to the preference of the operator.

I attain my object by an implement comprising a handle-bar, having an elongate operating-bar slidably mounted thereon. A blade is mounted on the upper end of said operating bar, and a hook is provided on the upper end of the handle-bar; the operating-bar being preferably spring controlled, so that, normally, the blade which it carries will be retracted from said hook; and the latter wire-like in cross section at the bill.

Details of construction, and the operation of my implement are hereinafter more fully described, and illustrated by the accompanying drawings, in which:

Fig. 1 is a perspective elevation of my implement showing its practical use for thinning the fruit of an apple tree;

Fig. 2 is a front elevation of my implement with the middle portion broken away.

Fig. 3 is a similar side elevation with parts in section to show details of construction.

Fig. 4 is a sectional detail of the top end of the operating bar and of the reversible and adjustable blade removably secured to such top end;

Fig. 5 is a similar view to Fig. 4, showing the blade reversed with respect to its position in Fig. 4, so as to present the square-edge end; and Fig. 6 illustrates, diagrammatically, certain features of my implement, hereinafter fully described.

My implement consists of a handle-bar $a$, preferably made with rounded edges. On the handle bar is slidably mounted a companion or operating-bar $b$. On the upper end of the handle-bar $a$ is fastened a hook $c$. This hook, as more clearly shown in Figs. 1 and 2, is of rounded or circular form and has a shank which extends a substantial distance beyond the upper end of the handle bar, and wire-like in cross section at the bill so that it may be inserted between closely grown stems bearing fruit without danger of breaking of the fruit not to be removed. The shank may be tapered to the point $c'$ of the jointure of the bill of said hook with its shank, so that at this point the hook will be of diminutive cross section, the space at one side of the shank of the hook will be substantially equal to the space encompassed by said bill, and the center of the latter space coincides with the longitudinal center of the handle-bar. The bill of the hook $c$ is preferably made square in cross-section along its bottom edge between the points $c$ and $c^2$ (compare Figs. 2 and 6) thereby facilitating the operation of my implement. And it is to be noted from Fig. 6 that this square edge $c^2$ of the bill of the hook should be approximately located so as to aline with the cutting edge of the blade $d$, whether the latter is made with a chisel edge $d^2$, or a square edge $d'$.

The upper end $a^2$ of the handle-bar $a$ is preferably tapered so that there is no protruding portion which might catch on a limb of the tree.

To the upper end of the operating-bar $b$ is removably secured a reversible knife-blade $d$. This knife-blade is preferably made with a square edge as $d'$ at one end, and the other end may be made with a chisel or knife edge as at $d^2$ in Figs. 4 and 5. The purpose in making the blade $d$ reversible, so that it will present a square edge or chisel-like edge, is to provide an implement which will meet the ideas of the operator with regard to the best mode of removing the surplus fruit growth from the cluster. When a chisel-like edge, as shown by $d^2$ in Fig. 4 is provided on the blade $d$ the removal of the surplus fruit growth may result in the stem of the latter being cut with a sharp point, which would have a tendency to penetrate and bruise the adjacent fruit growth. Therefore, in order to avoid such result it may be considered preferable in most cases to use the square edge of the blade, so that in removing the surplus fruit the stem thereof will be broken off, as it were, and will leave a broken end as indicated at $e$ in Fig. 1, presenting no sharp point.

In order to make my implement convenient to operate it is desirable that the operating-bar $b$ be normally retracted from the hook $c$; in other words, held in the position in which it is shown in Figs. 2 and 3. To this end the handle-bar is provided with a longitudinal elongated slot $f$ in which is located a spring $g$, one end of which is connected to the operating-bar $b$ as at $h$ in Fig. 3, and the opposite end of the spring being connected to a handle-bar, as at $i$, in Fig. 3. The operating-handle $b$ is slidably mounted on the handle bar $a$ by the headed pins $j$ and $k$ bearing in the slots $l$ and $m$ of the operating bar.

The implement may be made in various lengths to suit the convenience of the operator. As for example, the handle may be made 2, 4, 6 or 8 feet long. The handle-bar and the operating-bar should be so relatively proportioned that my implement may be conveniently grasped at any point of its length, and not require the moving of the hand to the end of the handle-bar. And preferably the operating handle $b$ should be made of greater width than the handle-bar $a$ so that it will serve as a guide to the operator's hand. In other words, guiding the grasp of the operator's hand to the operating handle, preventing the fingers from overlapping the latter and seizing, accidentally, the sides of the handle-bar, and thus interfering with the operation of my implement. Instead guiding the grasping fingers of the operator's hand to the sides of the handle of the operating-bar, thus facilitating the operation of my implement without requiring any special attention on the part of the operator.

My experience taught me that it is convenient to make the handle-bar 1½ inches wide by ¾ inches thick, and the operating-bar ¾ inch wide by ¼ inch thick, in that way combining necessary strength with desired lightness.

The mode of operating my implement is illustrated by Fig. 1. The handle-bar of my implement is firmly held with the left hand, and the operating-bar seized by the right hand, then the hook $c$ is caught on the stem of the fruit growth to be removed, and the operator slides the operating-bar with a quick upward movement. In so doing the blade $d$ cuts the stem of the fruit growth to be removed, without danger of injuring the other fruit of the cluster. Upon releasing the handle-bar the spring $g$ will return to its normal position; that is, retract it again from the hook as shown in Figs. 2 and 3 by reason of the hook $c$ of my implement being made of circular form at its upper end, or curved portion, adjacent stems about the stem of the fruit to be removed are not injured, and obstacles are readily avoided.

It will be found that one of my implements 6 or 8 feet long may be successfully used on fruit only 2 feet away by simply grasping the implement near its top.

The particular detail of construction of my improvement may be varied to suit the convenience of the manufacturer, provided the operating parts be adapted so as to function substantially as described.

I claim:

1. In a fruit thinner, a handle bar, a hook provided at the upper end of the handle bar, the upper or curved portion of said hook being of circular form and of circular cross section, a companion bar relatively slidable on the handle bar, and a knife-blade provided at the upper end of the companion bar.

2. In a fruit thinner, a handle bar, a hook provided at the upper end of the handle bar, the upper or curved portion of said hook being of rounded form and of circular wire-like cross section, a companion bar relatively slidable on the handle bar, a knife blade provided at the upper end of the companion bar, and a spring element normally holding the companion bar retracted.

3. In a fruit thinner, a handle bar, a hook provided at the upper end of the handle bar, the upper or curved portion of said hook being of circular form and of circular cross section, a companion bar relatively slidable on the handle bar, and a knife blade provided at the upper end of the companion bar, said companion bar being made of greater width than the handle bar for the purpose specified.

4. In a fruit thinner, a handle bar, a hook provided at the upper end of the handle bar, the upper or curved portion of said hook being of rounded form and of wire-like cross section, a companion bar relatively slidable on the handle bar, a knife blade provided at the upper end of the companion bar, and a spring element normally holding the companion bar retracted, said companion bar being made of greater width than the handle bar for the purpose specified.

ALSTYNE J. GROW.